US005379343A

United States Patent [19]
Grube et al.

[11] Patent Number: 5,379,343
[45] Date of Patent: Jan. 3, 1995

[54] DETECTION OF UNAUTHORIZED USE OF SOFTWARE APPLICATIONS IN COMMUNICATION UNITS

[75] Inventors: Gary W. Grube, Palatine; Timothy W. Markison, Hoffman Estates, both of Ill.

[73] Assignee: Motorola, Inc., Schaumburg, Ill.

[21] Appl. No.: 23,292

[22] Filed: Feb. 26, 1993

[51] Int. Cl.$^6$ .............................................. H04L 9/00
[52] U.S. Cl. ......................................... 380/4; 380/25
[58] Field of Search ................................ 380/4, 25

[56] References Cited

U.S. PATENT DOCUMENTS

| | | | |
|---|---|---|---|
| 4,691,355 | 9/1987 | Wirstrom et al. | 380/25 |
| 4,694,492 | 9/1987 | Wirstrom et al. | 380/25 |
| 4,891,504 | 1/1990 | Gupta | 380/25 |
| 4,956,769 | 9/1990 | Smith | 380/25 |
| 5,073,934 | 12/1991 | Matyas et al. | 380/25 |
| 5,113,442 | 5/1992 | Moir | 380/25 |
| 5,204,961 | 4/1993 | Barlow | 380/4 |
| 5,208,853 | 5/1993 | Armbruster et al. | 380/4 |
| 5,239,648 | 8/1993 | Nukui | 380/4 |

Primary Examiner—Salvatore Cangialosi
Attorney, Agent, or Firm—Timothy W. Markison

[57] ABSTRACT

A monitoring computer monitors the communications occurring within at least one communication system for at least one unique communication unit identification code (unit ID code) associated with a communication unit. Upon detecting the at least one unit ID code, the monitoring computer compares the type of communication made by the communication unit with known software parameters (including the allowable types of communications) for the communication unit. When the type of communication made by the communication unit does not substantially match the known software parameters for the communication unit, the communication unit is identified as using an unauthorized and/or duplicated software application.

10 Claims, 3 Drawing Sheets

FIG. 2

| UNIT ID CODE (201) | FEATURES (202) | APPLICATION & SERIAL NUMBERS (203) | LOCATION & TIME & COUNT (204) | GROUP ID CODE (205) |
|---|---|---|---|---|
| 1 | 3,5,7 | 10-3763 | 22/18:10/3 | 201 |
| 2 | 1,3,8 | 9-4509756 | 15/18:20/5 | 201 |
| 3 | 3,4,5 | 49-46383 | 6/14:00/2 | 300 |
| ... | | | | |

| UNIT ID CODE (206) | FEATURES (207) | APPLICATION & SERIAL NUMBERS (208) | COPIES (209) |
|---|---|---|---|
| 201 | 1,3,5,7,8 | 10-3763<br>9-4509756<br>30-29463 | 1<br>1<br>2 |
| 202 | 11 | | |
| 300 | 3,4,5,10 | 49-46383 | 10 |
| ... | | | |

DETECTION OF UNAUTHORIZED USE OF SOFTWARE APPLICATIONS IN COMMUNICATION UNITS

FIELD OF THE INVENTION

The present invention relates generally to communication systems and, in particular, to the detection of unauthorized use of software applications.

BACKGROUND OF THE INVENTION

The basic operation and structure of land mobile radio communication systems and cellular radio/telephone communication systems (communication systems) are known. Communication systems typically comprise a plurality of communication units (vehicle mounted or portable radios in a land mobile system and radio/telephones in a cellular system), a predetermined number of repeaters, which are located throughout a geographic region, that transceive information via communication channels, and a controlling entity. A controlling entity may either be a centralized call processing controller or it may be a network of distributed controllers working together to establish communication paths for the communication units.

In the course of normal operations, communication units can often utilize various communication services or features to communicate with one another. For instance, a communication unit may be capable of group dispatch, private call, secure voice, telephone interconnect and other services (as found in a Motorola Smart-Net ™ or Privacy Plus ™ communication system), or a subset of such services. The provision of multiple communication services typically add value to those communication units capable of such services. This added value is often reflected by communication system manufacturers as an added premium to the cost of the communication units. For instance, a customer may purchase a Privacy Plus ™ system and pay an extra fee to allow a certain group of mobiles to have additional telephone interconnect capabilities. Quite often, the distinguishing characteristics between a "regular" mobile and an "enhanced" mobile are the software applications operating within each communication unit.

Typically, there are two techniques which allow the selective utilization of software applications by a communication unit. In the first technique, each communication unit is programmed at the manufacturer's factory with software applications stored in a non-volatile memory such as PROM (programmable read-only memory). Regular and enhanced communication units are distinguished by codeplug bits which enable various software applications. Thus, the non-volatile memories of both a regular and enhanced communication unit contain the same software, but those applications necessary for additional types of communication are enabled (via the codeplug bits) only in enhanced communication units. Alternatively, an external programming device may be used to enable software applications. For instance, many communication products made by Motorola utilize Radio Service Software (RSS), which operates on a typical personal computer, to enable various software features.

A second technique for selective software utilization is to add software applications via an external programming device similar to RSS. For this technique, individual communication units contain a reprogrammable non-volatile memory such as EEPROM (electrically erasable programmable read-only memory) for storing the software applications. Thus, the memory of a regular communication unit will contain only those software applications necessary for basic operation whereas the memory of an enhanced communication unit will contain software applications which allow other types of communication in addition to the basic operation. Unfortunately, neither of the two techniques discussed above are able to fully prevent unauthorized use of software applications.

It is possible for a user to copy the non-volatile memory of an enhanced communication unit and place the replicated software applications into the non-volatile memory of a regular unit, thereby creating a substantially identical enhanced unit without paying an additional fee. Such tactics are often employed in systems where a user is charged according to the number of communication unit identification codes (unit ID codes) used in the system. By duplicating a communication unit's memory, and hence its ID code, additional communication units can be provided. Alternatively, anyone in possession of the appropriate external programming device can illicitly enable or add unauthorized software applications. Although many communication systems possess means for denying access to communication units that are incorrectly programmed, some system operators do not enable these means, thus allowing unauthorized use. The unauthorized use and duplication of software applications and unit ID codes not only cheats manufacturers of their entitled fees, they also overburden critically scarce communication resources and interfere with the authorized communications of other communication units.

Further exacerbating the use of unauthorized software applications is the difficulty of its detection. Often, the only way to detect unauthorized use and duplication is to individually examine each communication unit within a system. Obviously, this is a costly proposition for systems comprising thousands of communication units. Therefore a need exists for a method which allows the detection of unauthorized use and duplication of software applications and unit ID codes in communication units.

BRIEF DESCRIPTION OF THE DRAWINGS

FIG. 2 illustrates a database format which may be used by the monitoring computer in accordance with the present invention.

DESCRIPTION OF A PREFERRED EMBODIMENT

Generally, the present invention provides detection of unauthorized use and duplication of software applications by communication units in a communication system. This is accomplished by associating a monitoring computer with the communication system to monitor communications within the communication system. While monitoring communications, the monitoring computer compares those services used by various communication units with a database of authorized services, thus detecting illicit use and/or duplication.

Figure 1:
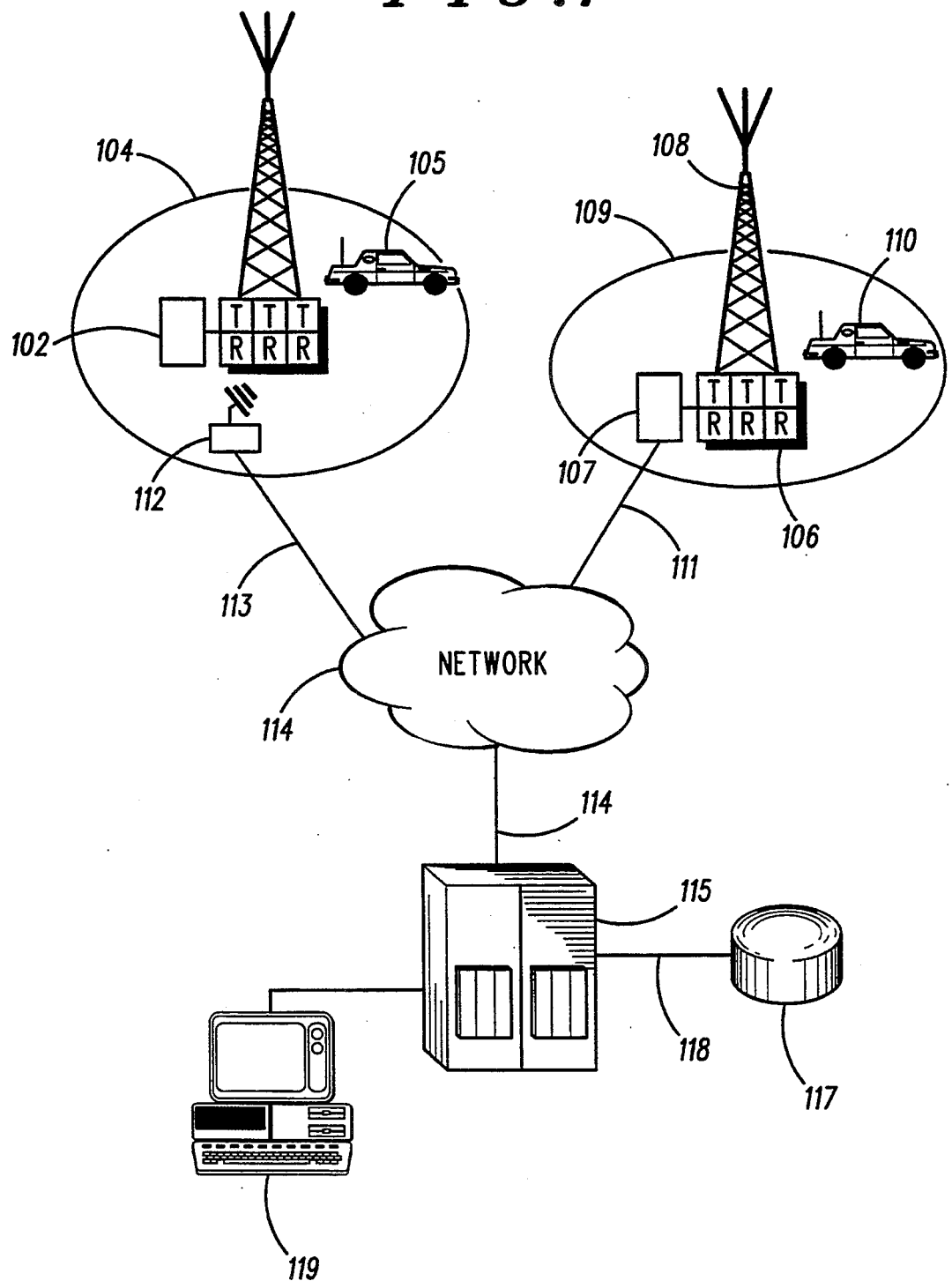
FIG. 1 illustrates a multi-site communication system, equipped with a monitoring computer, in accordance with the present invention.

The present invention can be more fully described with reference to FIGS. 1-4. FIG. 1 illustrates multiple communication systems operably connected to a monitoring computer. All of the individual elements are readily known in the art, thus no further discussion will be presented regarding their operation other than to further illustrate the present invention. The communication systems comprise a plurality of communication units (105, 110), a predetermined number of repeaters (101, 106) operably connected to fixed antenna systems (103,108) providing respective coverage areas (104, 109), and a call processing controller (102, 107) to establish communications between two or more communication units. A communication system may be interconnected to a network (114) by a direct link (111) to the call processing controller (107). Alternatively, a communication system may be connected by a link (113) to the network (114) by way of an over-the-air radio modem (112), which in turn communicates with the call processing controller (102) over at least one of the channels in the group of site repeaters (101). The network (114) is also connected by a link (116) to a monitoring computer (115) which is operably connected to a database (117) and to at least one computer terminal (119) via links (118,120). The monitoring computer (115), database (117), and computer terminal (119) may comprise a commercially available mid-range computing device, such as an IBM AS400. The link (116) provides the monitoring computer (115) with control information that is embedded in the network (114) protocol. Relevant control information is extracted by the monitoring computer (115) from the network (114) protocol for processing. The manner in which the monitoring computer (115) is coupled to the network (114) as well as the manner in which control information is routed to the monitoring computer (115) is dependant upon the actual computing device used to implement the monitoring computer (115) and the network (114) protocol.

FIG. 2 illustrates database tables which contain, for each communication unit to be monitored, software application parameters that are stored in the database (117). In the first table, a unit ID code field (201) represents the identities of the communication units. Communication units are normally assigned a unique identity code to differentiate them from other communication units. Associated with each unit ID code are several other fields used to determine valid software parameters. The features field (202) lists which of the possible imbedded service features this unit is allowed to use regardless of how the call processing controller (102, 107) actually responds to resource requests. For example, the communication unit identified with the unit ID code of 3 is allowed to use features 3, 4, and 5. An applications and serial numbers field (203) lists which additional software applications each unit ID code is authorized to use and have possession of. Each additional software application shown in the applications and serial numbers field (203) is uniquely identified by an authorized serial number. Following the current example, communication unit 3 is also allowed to use another software application, uniquely identified by the Ser. No. 49-46383. A location, time, and count field (204) is used to temporarily store location identities and time-stamps, or time indications, of system access by the communication units. The count entry within the location, time, and count field (204) is used by the monitoring computer (115) to track the number of accesses to the network (114) by each communication unit. Again using the current example, it can be seen that communication unit 3 last accessed the system, for the second time, at 1400 hours (2 PM standard time) while located within site 6. Finally, a group ID code field (205) associates an individual unit ID code to a group. In the current example, communication unit 3 is affiliated with the group identified by the group ID number 300.

Similarly, a second table associates group identities with their authorized features and applications. A group ID code field (206) represents the identity of a group of communication units. Groups of communication units are normally associated with a unique group identity code to differentiate them from other groups of communication units. Associated with each group ID code are several other fields used to determine valid software parameters. The features field (207) lists which of the possible imbedded service features units of this group are allowed to use regardless of how the call processing controller (102, 107) actually responds to resource requests. An applications and serial numbers field (208) lists which additional software applications members of this group ID code are authorized to use and have possession of. Each additional software application shown in the applications and serial numbers field (208) is uniquely identified by an authorized serial number. A copies field (209) identifies how many total copies of a particular application that the members of a group ID code are authorized to possess and use. For example, communication units affiliated with the group ID code 202 are allowed to use feature 11 only and are further authorized to use no more than 2 copies (as a group) of an additional software application uniquely identified by the Ser. No. 30-29463.

Figure 3:
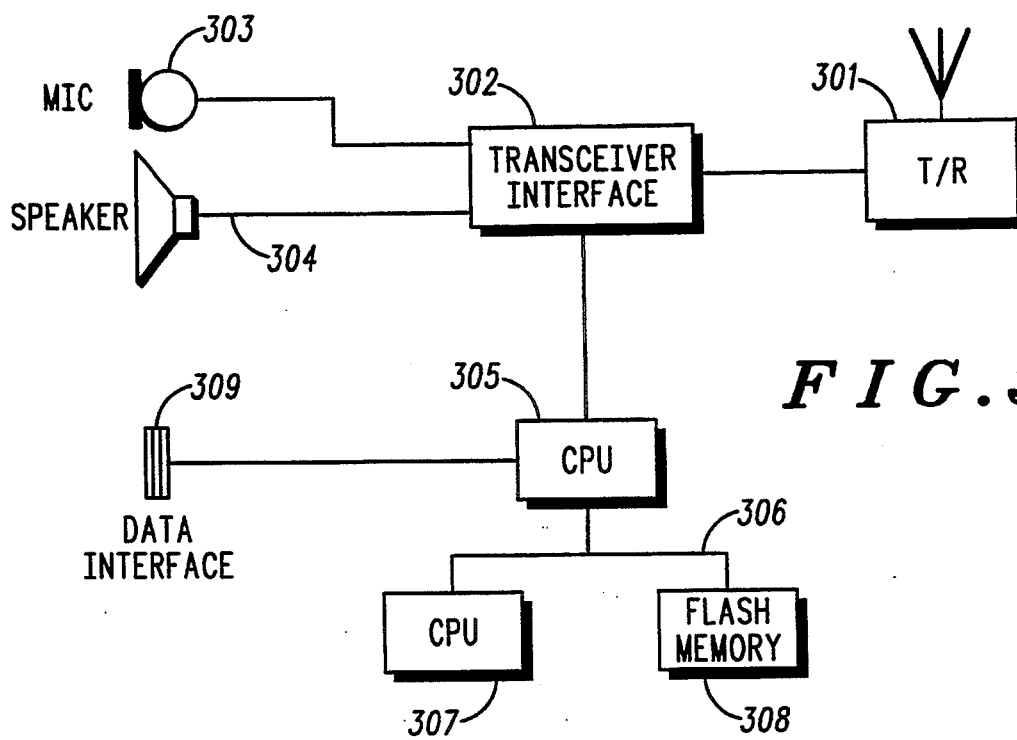
FIG. 3 illustrates a block diagram of a communication unit in accordance with the present invention.

FIG. 3 illustrates a block diagram of a communication unit used in the present invention. All of the individual elements are readily known in the art, thus no further discussion will be presented regarding their operation other than to further illustrate the present invention. A radio transceiver (301) is employed to link a communication system to the logic and operator of the communication unit. Depending on the application or type of communication, different channel activity will take place on the radio link. The communication channels may be TDM (time-division multiplexed) slots, carrier frequencies, a pair of carrier frequencies or other radio frequency (RF) transmission medium. A frequency or time portion of one or more of the communication channels may be established for call control purposes to allow the communication unit or processing device logic to communicate with the call processing controller to request and receive system resources. A transceiver interface (302) operably couples the transceiver (301) to the internal logic and audio input/output devices such as a microphone (303) and a speaker (304). These elements may be used in routine voice communications between users of two or more communication units. In addition to providing modulation/demodulation functions for the microphone (303) and speaker (304), the transceiver interface (302) also couples the communication unit CPU (305) and logic to the transceiver (301). The CPU (305) may comprise a Motorola 68HC11 microprocessor. The CPU (305) provides control of the communication unit and also provides direct communication to other external computing devices by way of a data interface (309). The data interface (309) may comprise an EIA standard port such as RS-232, RS-422, or another type. The data interface (309) may communicate data communications between users of two or more communication units and may be used to load new software applications into the communication units for use at a later time. New software applications are stored in non-volatile flash memory (308) which is operably coupled with the CPU (305) through a data and address bus (306). Temporary operating variables may be stored and retrieved by the CPU (305) in RAM (307).

Figure 4:
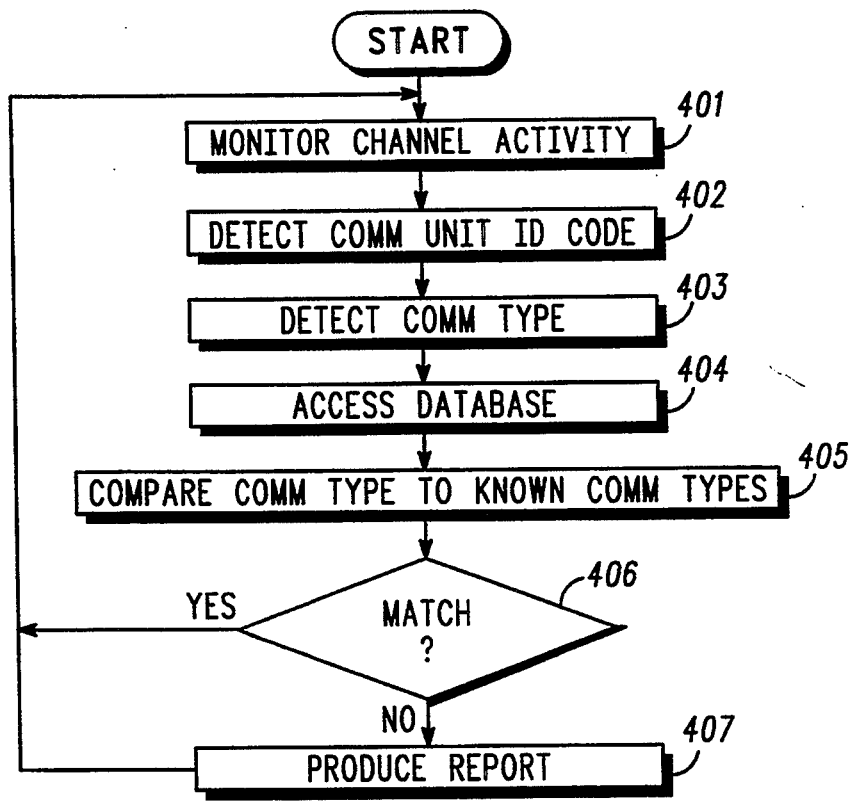
FIG. 4 illustrates a logic diagram that may be used to implement the present invention.

FIG. 4 depicts a logic diagram of the operation of the monitoring computer (115) in accordance with the present invention. Channel activity is monitored (401) at each of the communication systems. This channel activity is a result of communications of at least one communication unit served by the communication systems. The communications may contain voice, text, images, multi-media, or other information. The communication unit may contain software applications for various types of communications or features such as group dispatch, private call, telephone interconnect, data call, and others. The channel activity routinely contains call establishment and identification information which is communicated to the monitoring computer (115) by a direct link (111) or by a radio link (113). A particular communication unit ID code can be detected (402) in this channel activity. The communication type is also detected (403) from the channel activity. The database (117) associated with the monitoring computer (115) is accessed (404) to obtain the information relevant to the previously detected communication unit ID code. If desired, information retrieved from the database (117) can be referenced by the group ID code in place of, or in addition to, the unit ID code. The tables of database entries (as in FIG. 2) are examined to compare (405) the type of communication detected with known software parameters associated with this communication unit. These software parameters include which type of communications as well as features this communication unit is authorized to possess and use. If a match is made (406), i.e. the type of communications detected in the channel activity matches a known and authorized type of communications for this communication unit, the monitoring computer (115) continues to monitor channel activity.

If, however, a match is not made (406), the monitoring computer (115) identifies this and may generate a report (407) to indicate that the communication unit associated with the detected unit ID code is using an unauthorized type of communication and/or a duplicated software application. If the type of communication used is compared with the allowable types of communication for a group and a match is not made, a report is produced (407) to indicate that at least one communication unit associated with the detected group ID code is using an unauthorized type of communication and/or a duplicated software application. Upon completion of the report, or while the report is being compiled, further channel activity monitoring continues as described above.

The present invention allows a monitoring computer to monitor channel activity of multiple communication systems to compare the types of communications used by the plurality of communication units to a predetermined database of authorized types of communication. A report can be issued in the event that the types of communication used by at least one communication unit do not match the predetermined list of authorized types of communication. This process is also applicable to communication units that are referenced according to their group's ID codes. By monitoring communications in this manner, the unauthorized use and duplication of software applications in communication units can be detected without physically investigating each communication unit.

We claim:

1. In a land mobile radio or cellular radio/telephone communication system that includes a plurality of RF communication channels, a method for detecting unauthorized use of a software application within a communication unit, the method comprises the steps of:
   a) monitoring, by an RF receiver of a monitoring computer, RF communication channel activity of at least one communication system for a communication involving the communication unit;
   b) when a communication involving the communication unit is detected, comparing, by the monitoring computer, type of the communication with unique software application identifier for the communication unit;
   c) when the type of the communication does not match the unique software application identifiers, identifying, by the monitoring computer, that the type of communication involving the communication unit does not match the unique software application identifiers.

2. In the method of claim 1, the monitoring of communication channel activity of step (a) further comprises monitoring, by the monitoring computer, communication unit identification code of the communication unit and the type of communication.

3. In the method of claim 2, the comparing of the type of communication with the unique software application identifiers of step (b) further comprises accessing, by the monitoring computer, a database that contains the unique software application identifiers, wherein the unique software application identifiers include at least a representation of types of communication software applications that a particular communication unit is authorized to use.

4. The method of claim 1 further comprises generating, by the monitoring computer, a report indicating that the communication unit has unauthorized use of a software application.

5. In a land mobile radio or cellular radio telephone communication system that includes a plurality of RF communication channels, a monitoring computer for monitoring and detecting unauthorized use of a software application within a communication unit, the monitoring computer comprises:
   an RF monitor, wherein the RF monitor monitors communications within the land mobile radio or cellular radio/telephone communication system;
   a detector that is operably coupled to the RF monitor, wherein the detector detects a communication unit identification code of the communication unit and type of communication;
   memory that stores unique software application identifiers of the communication unit;
   a comparator that is operably coupled to the detector and the memory, wherein the comparator compares the communication unit identification code and the type of communication with the unique software application identifiers; and
   an identifier that is operably coupled to the comparator, wherein the identifier identifies when the communication unit identification code and the type of communication do not substatnially match the unique software application identifiers.

6. In the monitoring computer of claim 5, the monitoring computer further comprises:

generating means, operably coupled to the identifying means, for generating a report indicating that the communication unit identity code and the type of communication do not substantially match the unique software application identifiers.

7. In a communication system network that includes a plurality of land mobile radio communication systems and a plurality of communication units, wherein a communication unit from the plurality of communication units is affiliated with a group of communication units, a method for detecting unauthorized use of a software application within a communication unit, the method comprises the steps of:

a) monitoring, by an RF receiver a monitoring computer, RF communication channel activity of at least one land mobile radio communication system for a communication involving the communication unit;

b) when a communication involving the communication unit is detected, comparing, by the monitoring computer, type of the communication and group identification code with unique group software application identifiers of the group of communication units;

c) when the type of the communication and group identification code does not match the unique group software application identifiers, identifying, by the monitoring computer, that the type of communication involving the communication unit does not match the unique group software application identifiers.

8. In the method of claim 7, the monitoring of RF communication channel activity of step (a) further comprises monitoring, by the monitoring computer, communication unit identification code of the communication unit and the type of communication and the group identification code.

9. In the method of claim 8, the comparing of the type of communication with the unique group software application identifiers of step (b) further comprises accessing, by the monitoring computer, a database that contains the unique group software application identifiers wherein the unique group software application identifiers include at least a representation of types of communication software applications that the group of communication units is authorized to use.

10. The method of claim 7 further comprises generating, by the monitoring computer, a report indicating that the communication unit has unauthorized use of a software application.

* * * * *